(12) United States Patent
Revaux et al.

(10) Patent No.: US 11,073,426 B2
(45) Date of Patent: Jul. 27, 2021

(54) PYROELECTRIC SENSOR WITH IMPROVED ABRASION-RESISTANCE COATING

(71) Applicant: COMMISSARIAT A L'ENERGIE ATOMIQUE ET AUX ENERGIES ALTERNATIVES, Paris (FR)

(72) Inventors: Amelie Revaux, Grenoble (FR); Mohammed Benwadih, Grenoble (FR); Jean-Francois Mainguet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 98 days.

(21) Appl. No.: 16/657,493

(22) Filed: Oct. 18, 2019

(65) Prior Publication Data
US 2020/0124482 A1  Apr. 23, 2020

(30) Foreign Application Priority Data

Oct. 19, 2018 (FR) .................................. 18 59680

(51) Int. Cl.
| | | |
|---|---|---|
| G01J 5/34 | (2006.01) | |
| G01J 5/04 | (2006.01) | |
| G01J 5/08 | (2006.01) | |
| G01J 5/52 | (2006.01) | |
| G06K 9/00 | (2006.01) | |

(52) U.S. Cl.
CPC ................. *G01J 5/34* (2013.01); *G01J 5/048* (2013.01); *G01J 5/0803* (2013.01); *G01J 5/52* (2013.01); *G06K 9/00053* (2013.01)

(58) Field of Classification Search
CPC .. G01J 5/34; G01J 5/048; G01J 5/0803; G01J 5/52; G06K 9/00053; G06K 9/0002
USPC ........................................................ 250/338.2
See application file for complete search history.

(56) References Cited

U.S. PATENT DOCUMENTS 8,801,274 B2  8/2014  Mainguet et al.

FOREIGN PATENT DOCUMENTS

| EP | 2 385 486 A1 | 11/2011 |
|---|---|---|
| EP | 3 276 585 A1 | 1/2018 |
| FR | 3 044 408 A1 | 6/2017 |

(Continued)

OTHER PUBLICATIONS

French Preliminary Search Report dated Jul. 4, 2019 in Patent Application No. 1859680, 2 pages (with English translation of categories of cited documents).

(Continued)

*Primary Examiner* — David P Porta
*Assistant Examiner* — Gisselle M Gutierrez
(74) *Attorney, Agent, or Firm* — Oblon, McClelland, Maier & Neustadt, L.L.P.

(57) ABSTRACT

A thermal pattern sensor including a plurality of pixels arranged on a substrate. Each pixel has a pyroelectric capacitance formed by at least one pyroelectric material portion arranged between a lower electrode and an upper electrode. The sensor has an abrasion-resistance coating, located on the side opposite the substrate and including pillars embedded in an abrasion-resistance layer, the pillars having a thermal conductivity strictly higher than that of the abrasion-resistance layer. A high thickness of the anti-abrasion protection coating can be achieved with a high rate of thermal transfer through the latter.

15 Claims, 4 Drawing Sheets

(56) References Cited

FOREIGN PATENT DOCUMENTS

WO    WO 2018/020176 A1    2/2018

OTHER PUBLICATIONS

U.S. Appl. No. 16/186,926, filed Nov. 12, 2018, US 2019-0148618 A1, Amélie Revaux.
U.S. Appl. No. 16/207,313, filed Dec. 3, 2018, US 2019-0170587A1, Mohammed Benwadih.
U.S. Appl. No. 16/230,162, filed Dec. 21, 2018, US 2019-0195693A1, Mohammed Benwadih.
U.S. Appl. No. 15/816,004, filed Nov. 17, 2017, US 2018-0145396 A1, Mohammed Benwadih.
U.S. Appl. No. 15/831,583, filed Dec. 5, 2017, US 2018-0155508 A1, Mohammed Benwadih.
U.S. Appl. No. 16/207,614, filed Dec. 3, 2018, US 2019-0204167 A1, Mohammed Benwadih.
U.S. Appl. No. 16/207,846, filed Dec. 3, 2018, US 2019-0172994 A1, Mohammed Benwadih.
U.S. Appl. No. 16/207,653, filed Dec. 3, 2018, US 2019-0172993 A1, Mohammed Benwadih.
U.S. Appl. No. 16/229,648, filed Dec. 21, 2018, US 2019-0195692 A1, Mohammed Benwadih.
U.S. Appl. No. 15/662,805, filed Jul. 28, 201, US 2018-0032782 A1, Jean-Francois Mainguet.
U.S. Appl. No. 15/662,778, filed Jul. 28, 2017, US 2018-0032781 A1, Jean-Francois Mainguet.
U.S. Appl. No. 15/900,505, filed Feb. 20, 2018, US 2018-0240843 A1, Jean-Francois Mainguet.
U.S. Appl. No. 16/064,620, filed Jun. 21, 2018, US 2019-0012513 A1, Jean-Francois Mainguet.
U.S. Appl. No. 15/779,738, filed Nov. 28, 2016, Jean-Francois Mainguet.
U.S. Appl. No. 16/064,759, filed Jun. 21, 2018, US 2019-0005296 A1, Jean-Francois Mainguet.
U.S. Appl. No. 16/041,233, filed Jul. 20, 2018, Jean-Francois Mainguet.
U.S. Appl. No. 16/320,172, dated Jan. 24, 2019, Jean-Francois Mainguet.
U.S. Appl. No. 16/579,327, dated Sep. 23, 2019, Jean-Francois Mainguet.

PYROELECTRIC SENSOR WITH IMPROVED ABRASION-RESISTANCE COATING

TECHNICAL FIELD

The invention relates to a pyroelectric sensor-type thermal pattern sensor. Such a sensor forms, for example, a papillary print sensor, in particular a fingerprint sensor.

PRIOR ART

A pyroelectric sensor uses the properties of pyroelectricity of a material, i.e. its capacity to generate electric charges in response to a temperature variation.

Such a sensor has pyroelectric capacitances, each forming a transducer for translating a time-dependent variation in temperature into an electric signal. Each pyroelectric capacitance has a portion made of a pyroelectric material, arranged between a lower electrode and an upper electrode. One of the electrodes is set to a constant potential, and forms a reference electrode. The other electrode, called the charge collection electrode, collects the pyroelectric charges generated by the pyroelectric material in response to a temperature variation. The charge collection electrode is connected to a readout circuit, for measuring the quantity of charges collected.

In operation, an object is pressed against a contact surface of the sensor.

The detection may simply use a difference in temperature between said object and said contact surface. The sensor then carries out a passive detection.

In the case of a fingerprint detection, the finger is pressed against the contact surface of the sensor.

At the ridges of the fingerprint, the skin is in direct physical contact with the sensor. A thermal transfer between the skin and the contact surface of the sensor occurs by conduction, leading to a first time-dependent temperature variation.

At the valleys of the fingerprint, the skin is not in direct physical contact with the sensor. A thermal transfer between the skin and the contact surface of the sensor occurs through the air. The air has thermal insulation properties, leading to a second, less significant, time-dependent temperature variation.

The difference between these two time-dependent temperature variations results in a difference between the signals measured by the pyroelectric capacitances, depending on whether they are located under a valley or under a ridge of the fingerprint. The image of the fingerprint then shows a contrast based on this difference.

After several seconds, the temperature of the finger and the temperature of the contact surface get closer, and it is no longer possible to obtain a satisfactory contrast. To overcome this disadvantage, heating means are added below the contact surface in order to dissipate a certain quantity of heat into each pixel of the sensor. The temperature variation measured in each pixel of the sensor then relates to the extent to which said quantity of heat is discharged from the pixel. This makes it possible to improve, and to preserve over time, the contrast of an image acquired by means of said sensor. The sensor then carries out an active detection. Such a sensor is described, for example, in the patent application EP 2 385 486.

In the case of a fingerprint detection, the temperature variation is high at the valleys of the fingerprint, where the heat is transferred to the finger only through the air, and lower at the ridges of the fingerprint, where the heat is effectively transferred to the finger, by conduction.

Regardless of the type of detection implemented, a pyroelectric sensor advantageously comprises an anti-abrasion protection coating, in order to protect lower layers or stages from the mechanical wear associated with repeated contacts with the objects to be imaged, in particular fingerprints in the case of a papillary print sensor.

The anti-abrasion protection coating may consist of a layer of abrasion-resistant resin. To provide sufficient protection, the resin layer generally has a thickness greater than 20 µm. A disadvantage of such a resin layer, however, is that it slows down the exchanges of heat between the pyroelectric capacitances and an object to be imaged, due to the high thickness of the material to be passed through, and causes a loss in resolution due to the lateral conduction of heat to the adjacent pixels. The pixel readout of the sensor is therefore slowed, which may present problems in particular for large-scale sensors with many pixels.

A known solution consists in producing the anti-abrasion protection coating with DLC (diamond-like carbon). This material indeed has a very high abrasion resistance, and thus provides sufficient protection even with a reduced thickness. A DLC layer with a thickness of less than 1 µm, in particular between 200 nm and 300 nm, for example, provides sufficient protection. This range of thicknesses allows for high rates of transmission of the heat through the anti-abrasion protection coating. However, it remains technologically difficult and expensive to control the deposited thickness of DLC with as much precision, and the deposition temperatures are fairly incompatible with certain compounds constituting the pyroelectric sensor (in particular PVDF).

An objective of the present invention is to propose a solution for protecting a pyroelectric sensor from the mechanical wear associated with repeated contacts with objects to be imaged, which provides a high rate of heat transmission and reduced lateral diffusion, and the implementation of which does not present any particular technological difficulty.

DESCRIPTION OF THE INVENTION

This objective is achieved with a thermal pattern sensor comprising a plurality of pixels arranged on a substrate, each pixel having at least one pyroelectric capacitance formed by at least one portion of pyroelectric material arranged between at least one lower electrode and at least one upper electrode, with the lower electrode arranged between the substrate and the pyroelectric material portion, the sensor having an external so-called anti-abrasion protection coating, located on the side opposite the substrate.

The pillars form structures having a height substantially equal to the thickness of the abrasion-resistance layer, for example within 20%, or even within 5%, with respective lower faces of each of the pillars preferably distributed in the same plane parallel to the plane of the substrate. The pillars each take, for example, the form of a cylinder, or a stack of cylinders, with a height substantially equal to the thickness of the abrasion-resistance layer. The diameter of the pillars, in a plane parallel to the substrate, is advantageously less than a pixel pitch of the thermal pattern sensor, and preferably less than half of said pitch.

According to the invention, the anti-abrasion protection coating includes a so-called abrasion-resistance layer, and a plurality of pillars distributed in the abrasion-resistance layer, the pillars having a thermal conductivity strictly above that of the abrasion-resistance layer. In other words, the pillars have a high thermal conductivity, and extend in a layer having a low thermal conductivity. In still other words, the anti-abrasion protection coating has a heterogeneous structure consisting of pillars that are highly conductive of heat surrounded by a material that is a weak heat conductor. A ratio between the thermal conductivity of the pillars and the thermal conductivity of the abrasion-resistance layer is advantageously greater than or equal to 2, or even greater than or equal to 5. This ratio may even reach 10, 100 and even 1000.

The pillars are laterally surrounded by the material of the abrasion-resistance layer. In particular, they are entirely surrounded by the material of said layer, in planes parallel to the plane of the substrate.

The abrasion-resistance layer has an anti-abrasion protection function. In this context, the term abrasion refers to mechanical wear caused by friction. The term abrasion resistance refers to the capacity to resist said mechanical wear.

In the abrasion-resistance coating, heat is quickly propagated through the pillars, and slowly propagated through the abrasion-resistance layer. It is thus possible to combine, in the anti-abrasion protection coating, quick thermal transfers according to an axis orthogonal to the plane of the substrate, and slow thermal transfers in a plane parallel to the plane of the substrate. The ratio of the thermal transfer rates is, for example, greater than or equal to 2, or even greater than or equal to 10, or even greater than or equal to 100.

The invention thus makes it possible to limit the lateral diffusion of heat within the anti-abrasion protection coating, since the transfers of heat occur primarily by means of the pillars and the latter are embedded in the abrasion-resistance layer, with a low thermal conductivity. Thus, transfers of heat from one pixel of the pyroelectric sensor to another (diathermy) are prevented, during passage through the anti-abrasion protection coating. Such heat transfers prevent a thermal pattern on the contact surface of the pyroelectric sensor from being accurately reproduced at the pyroelectric material portions. They may occur with an anti-abrasion protection coating consisting of a thick layer of a highly thermally conductive material. In particular, the material of the pillars may have good abrasion-resistance properties (for example when the pillars are made of titanium or tungsten or DLC). An obvious solution would consist in using a solid layer of the material of the pillars to produce the anti-abrasion protection. Such a solution would however lead to high diathermy associated with the passage through the abrasion-resistance coating. The invention makes it possible, by increasing the rate of the thermal transfers through the anti-abrasion protection coating, and by limiting lateral thermal transfers, to improve the contrast of an image of the thermal pattern applied to the contact surface of the sensor.

As a complement or as an alternative, the invention makes it possible to reduce the power consumption of the thermal pattern sensor, by reducing the quantity of heat supplied by the heating elements in the case of an active detection sensor. Indeed, the increase in the vertical thermal transfer rate (according to an axis orthogonal to the plane of the substrate) enables a smaller amount of heat supplied by the heating elements to produce the same temperature variation at the pyroelectric capacitances, for the same acquisition time, by comparison with the prior art.

The increase in the vertical thermal transfer rate also has the effect of reducing the time necessary for heating the pyroelectric capacitances by means of heating elements, then bringing them to room temperature, in an active thermal detection sensor with a passive pixel addressing (without select transistors). It is thus possible to reduce a pixel readout time of the thermal pattern sensor until it is divided by a factor of 10 by comparison with the prior art.

Since the thermal transfers primarily take place by means of the pillars, the abrasion-resistance layer may have a high thickness without it impacting the thermal transfer rate. The latter may have, for example, a thickness greater than several micrometres, for example greater than or equal to 3 µm or even greater than or equal to 10 µm. This thickness is advantageously greater than or equal to 5% of a pixel pitch of the thermal pattern sensor, or even greater than or equal to 10% and even greater than or equal to 100% of said pixel pitch.

Thus, the technological constraints associated with the deposition of an ultrathin layer having a thickness of less than a micrometre are overcome, by comparison with the prior art using a fine layer of DLC. In particular, it is no longer necessary to very precisely control the thickness deposited in order to be certain that the anti-abrasion protection is sufficient at each point of the contact surface of the sensor. The same reduction in constraints similarly applies to a possible added thickness of the abrasion-resistance layer, going beyond the pillars and capable of serving as protection for the pillars if they are not sufficiently resistant to abrasion.

By removing the constraints concerning the thickness of the abrasion-resistance layer, the invention allows for a wide range of materials in order to produce the latter. It may in particular use materials that need to be deposited in a thick layer in order to be capable of providing sufficient anti-abrasion protection. It may in particular use materials that are less expensive and/or easier to deposit.

The anti-abrasion protection coating according to the invention, also referred to as the anti-abrasion protection stage, or simply the protection layer, thus constitutes a solution for protecting a pyroelectric sensor from the mechanical wear associated with repeated contacts with objects to be imaged, offering both:
  quick thermal transfers according to an axis orthogonal to the plane of the substrate, owing to the pillars with high thermal conductivity; and
  simple implementation, since said pillars may extend in a thick abrasion-resistance layer, the production of which does not pose any particular technological difficulty.

Preferably, the anti-abrasion protection coating has a thickness greater than or equal to 5% of a pixel repetition pitch of the thermal pattern sensor.

The anti-abrasion protection coating may have a thickness greater than or equal to 3 µm.

Advantageously, the thickness of the anti-abrasion protection coating is greater than or equal to the height of the pillars, with said thickness and said height each defined according to an axis orthogonal to the plane of the substrate, and a difference between the thickness of the anti-abrasion protection coating and the height of the pillars is less than or equal to 10% or even less than or equal to 5% of the height of the pillars.

Preferably, each pixel of the sensor comprises a portion of the anti-abrasion protection coating, said portion comprising a single pillar.

The pillars of the anti-abrasion protection coating advantageously have a thermal conductivity at least ten times greater than that of the abrasion-resistance layer.

The pillars of the anti-abrasion protection coating may include a metal or graphene.

The abrasion-resistance layer may include a benzocyclobutene-based material.

The abrasion-resistance layer is advantageously made of an electrically insulating material.

According to an advantageous embodiment, the pixels of the sensor are arranged in rows and columns, and each pixel also comprises a heating element capable of heating, by the Joule effect, the pyroelectric material portion of said pixel, and:
- the heating elements of the same row of pixels are formed together in a single piece, in the same heating strip;
- in each pixel, one of the upper electrode and lower electrode forms a charge collection electrode, and the charge collection electrodes of the same pixel column are formed together in a single piece in a charge collection macroelectrode; and
- each pillar of the anti-abrasion protection coating extends through an intersection region between an orthogonal projection of a heating strip and an orthogonal projection of a charge collection macroelectrode, in a plane parallel to the plane of the substrate.

The pillars of the anti-abrasion protection coating are advantageously each constituted by a plurality of basic pillars, superimposed according to an axis orthogonal to the plane of the substrate.

The invention also covers a method for producing the anti-abrasion protection coating of a sensor according to the invention, in which a step of producing the pillars includes the use of an ink based on metal and/or graphene particles.

The step of producing pillars may include one or more localized depositions of ink, by means of an inkjet printer.

Preferably, the production of the anti-abrasion protection coating includes the following steps:
- producing the abrasion-resistance layer, equipped with through-openings distributed according to a plane parallel to the plane of the substrate; and
- filling the through-openings with metal and/or graphene particle-based ink.

Alternatively, the production of the pillars may include the following steps:
- producing the abrasion-resistance layer, without an opening; and
- local exposures of the abrasion-resistance layer, in order to locally modify the thermal conductivity thereof and thus form pillars.

The method according to the invention, for producing an embodiment of the sensor as mentioned above with heating strips and charge collection macroelectrodes, advantageously comprises the following steps:
- depositing a photosensitive layer on a stack including the substrate, the pyroelectric capacitances and the heating elements;
- illuminating the photosensitive layer from the side of the substrate, by means of an etching light beam, the power of which is suitable for passing through said stack except where a heating strip and a charge collection macroelectrode are superimposed; and
- filling the openings etched in the photosensitive layer with the material of the abrasion-resistance layer.

BRIEF DESCRIPTION OF THE FIGURES

The present invention will be easier to understand on reading the description of examples of embodiments provided purely as a non-limiting indication, with reference to the appended figures, in which.

DETAILED DESCRIPTION OF SPECIFIC EMBODIMENTS

For greater clarity, the axes (Ox), (Oy) and/or (Oz) of an orthonormal reference system are shown in the figures. The figures, and in particular the thicknesses of each of the layers and/or stages and/or coating, are not drawn to scale.

Figure 1A:
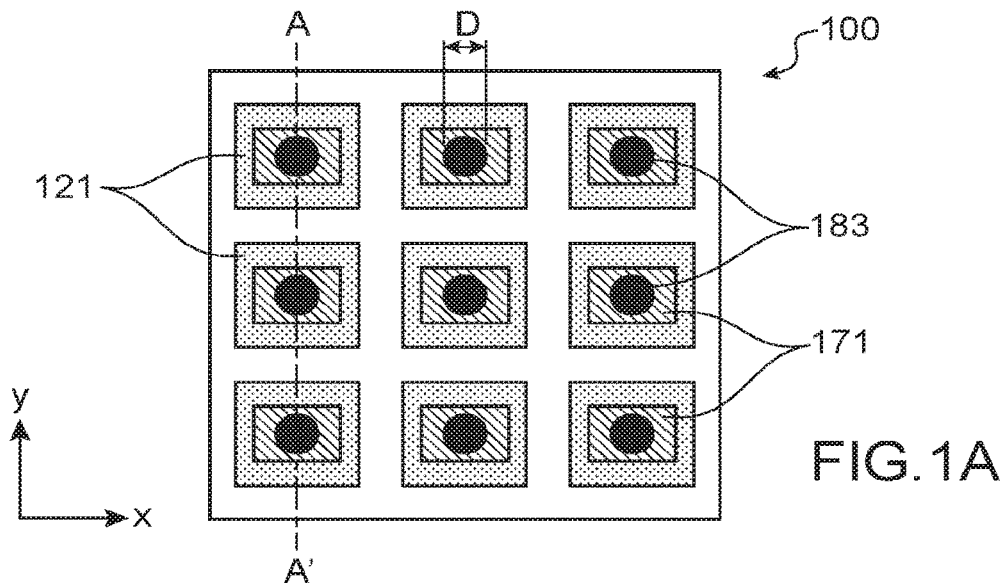
FIGS. 1A and 1B schematically show a first embodiment of a thermal pattern sensor according to the invention.
Figure 1B:
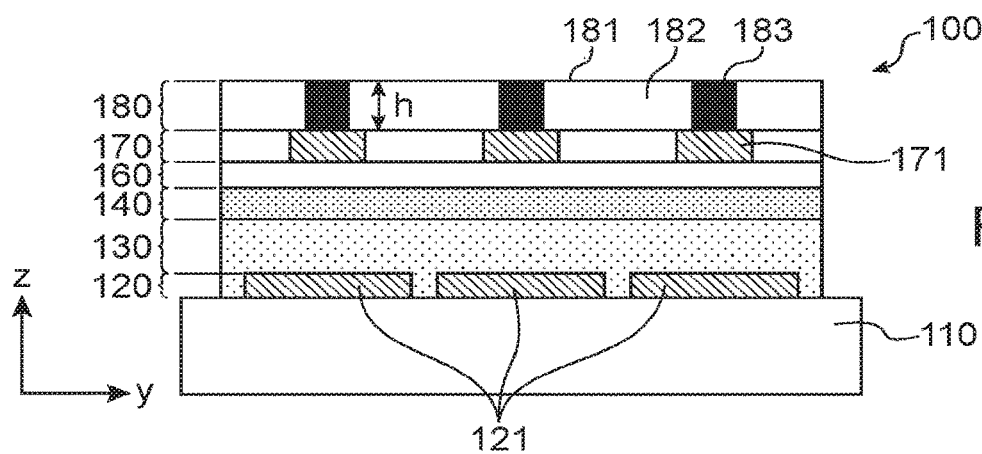

FIGS. 1A and 1B schematically show a first embodiment of a thermal pattern sensor 100 according to the invention. FIG. 1A is a schematic top view, in a plane parallel to the plane (xOy). FIG. 1B is a cross-section view in a plane AA' parallel to the plane (yOz).

The thermal pattern sensor 100 comprises, superimposed on a substrate 110, according to the axis (Oz) orthogonal to an upper or lower face of said substrate:
- a stage 120 referred to as the lower electrode stage;
- a stage 130 including a pyroelectric material;
- an electromagnetic shielding stage 140, in this case also forming an upper electrode common to the pixels of the sensor 100;
- an electric insulation layer 160;
- a heating stage 170; and
- an anti-abrasion protection coating 180.

This stack forms a pixel array in which each pixel comprises a pyroelectric capacitance, formed by a pyroelectric material portion arranged between a lower electrode, on the substrate side, and an upper electrode, on the side opposite the substrate. In this case, but in a non-limiting manner, the lower electrodes form charge collection electrodes as described in the introduction, and the at least one upper electrode forms a reference electrode as described in the introduction.

The substrate 110 is, for example, made of glass, silicon, a plastic such as polyethylene terephthalate (PET), polyethylene naphthalate (PEN), polyimide (film Kapton), etc. It is preferably a flexible substrate, for example a polyimide substrate with a thickness of 5 μm to 10 μm, or plastic, such as PET. It has an upper face and a lower face parallel to one another, and parallel to the plane (xOy). Below, the plane of the substrate refers to a plane parallel to said lower and upper faces.

The lower electrode stage 120 in this case comprises a charge collection electrode array 121, arranged in rows and columns according to the axes (Ox) and (Oy). The charge collection electrodes consist of a metal such as gold or silver, or any other electrically conductive material. They are distributed according to the axes (Ox) and (Oy), according to a repetition pitch less than or equal to 150 μm. The repetition pitch is, for example, around 80 μm, or 90 μm, or 50.8 μm.

The stage 130 including a pyroelectric material is in this case formed by a solid layer consisting of polyvinylidene fluoride (PVDF) or one of the derivatives thereof (in particular the copolymer PVDF-TrFE, TrFE for trifluoroethylene). Alternatively, the layer 130 includes aluminium nitride (AlN), barium titanate ($BaTiO_3$), lead zirconate titanate (PZT), or any other pyroelectric material. The layer 130 extends in this case but in a non-limiting manner, in a single piece, and without an opening, covering all of the charge collection electrodes 121 of the stage 120.

The electromagnetic shielding stage 140 forms an electrically conductive stage, capable of being connected to a constant potential source, for example the ground. It is constituted, for example, by a thin layer of an electrically and thermally conductive material, such as a mixture of poly(3,4-ethylenedioxythiophene) and sodium polystyrene sulfonate, referred to as PEDOT: PSS. The electromagnetic shielding stage 140 forms a stage separate from the anti-abrasion protection stage 180. According to the circumstances, it may have a heterogeneous structure consisting of thermally conductive pads in an electrically conductive and thermally insulating layer.

In this case, the stage 140 also forms a reference electrode, common to all of the pixels of the pixel array. The pixels are therefore laterally defined by the charge collection electrodes 121 alone. Each portion of the layer 130, located opposite a charge collection electrode 121, forms the pyroelectric material portion of a pixel. Similarly, each portion of the stage 140, located opposite a charge collection electrode 121, forms the reference electrode of a pixel.

The electrical insulation layer 160 is constituted by a dielectric material, for example polyimide. It preferably has a thickness of less than 5 µm, for example equal to 1 µm.

According to the embodiment of FIGS. 1A and 1B, each pixel of the pixel array also comprises a heating element 171. All of the heating elements 171 are located in the heating stage 170. The heating elements 171 are capable of receiving a heating current, in order to provide Joule heating so as to carry out an active detection. They are preferably constituted by a metal, for example gold or silver.

The anti-abrasion protection coating 180, or the anti-abrasion protection stage, forms the outermost stage of the sensor. An upper face 181 of said coating, on the side opposite the substrate 110, forms a contact surface of the sensor. In operation, an object to be imaged is applied against said contact surface 181, so as to carry out thermal exchanges with the stage 130 including a pyroelectric material. The anti-abrasion protection coating 180 is intended to protect the lower layers (between the contact surface 181 and the substrate 110) from wear associated with repeated contacts with an object to be imaged, in particular the skin. According to the invention, the anti-abrasion protection coating 180 is constituted by:
an abrasion-resistance layer 182 made of a material that is a poor thermal conductor; and
a plurality of pillars 183 made of a material that is a good thermal conductor.

The thermal conductivity of the pillars 183 is at least ten times greater than that of the abrasion-resistance layer 182, and even at least one hundred times, or even at least one thousand times greater. This ratio between the thermal conductivities is reflected in a ratio between the thermal transfer rates, via the pillars and via the abrasion-resistance layer, respectively.

During operation, heat flows quickly through the anti-abrasion protection coating 180 according to the axis (Oz) orthogonal to the plane of the substrate 110, preferably passing through the pillars 183.

However, heat does not flow easily from one pillar 183 to another, as it passes through the abrasion-resistance layer 182. Consequently, the heat flows slowly in the anti-abrasion protection coating 180, in a plane (Oxy) parallel to the plane of the substrate 110.

The abrasion-resistance layer 182 must be both a poor thermal conductor and a poor electrical conductor to avoid short-circuiting the heating elements 171. This offers great freedom in the choice of the material constituting the abrasion-resistance layer 182. In addition, the latter may be constituted by a material that must have a high thickness in order to provide sufficient abrasion resistance, without affecting the rate of thermal transfers according to (Oz).

In addition, and since the abrasion-resistance layer 182 is made of a material that is a poor thermal conductor, the heat remains confined in a pillar 183, and does not pass easily from one pillar 183 to the adjacent pillar, and therefore from one pixel to the adjacent pixel. Thus, a lateral diffusion of the heat in the anti-abrasion protection coating 180 is limited, as it would otherwise affect the quality of the image acquired at the pyroelectric capacitances.

The pillars 183 are constituted, for example, by a material having a thermal conductivity greater than or equal to 50 $W·m^{-1}K^{-1}$, and even greater than or equal to 100 $W·m^{-1}K^{-1}$, for example between 100 $W·m^{-1}K^{-1}$ and 500 $W·m^{-1}K^{-1}$.

The pillars 183 include, for example, a metal such as silver, gold, copper, aluminium, etc. They are, for example, produced by means of a metal-based ink, in particular a silver-based ink. When the pillars are produced by means of a metal-based ink, they are constituted by metal particles attached to one another, with a higher or lower percentage of volumetric occupancy by the metal. The pillars thus have a thermal conductivity below that of the pure metal. In its pure form, silver has a thermal conductivity of 429 $W·m^{-1}K^{-1}$. Pillars produced with a silver-based ink have a thermal conductivity below 429 $W·m^{-1}K^{-1}$ and greater than or equal to 69 $W·m^{-1}K^{-1}$, or even greater than or equal to 100 $W·m^{-1}K^{-1}$.

Alternatively, the pillars 183 may include graphene (two-dimensional material, the stack of which forms graphite, graphite being a crystallized form of carbon). They may be constituted entirely by graphene.

The abrasion-resistance layer 182 is preferably constituted by a material having a thermal conductivity less than or equal to 10 $W·m^{-1}K^{-1}$, and even less than or equal to 1 $W·m^{-1}K^{-1}$, for example between 0.1 $W·m^{-1}K^{-1}$ and 1 $W·m^{-1}K^{-1}$. It may be constituted by a resin, in particular a polymer resin including benzocyclobutene (BCB) or a polymer epoxide resin.

It advantageously has a thickness greater than or equal to 3 µm, preferably greater than or equal to 10 µm (dimension according to the axis (Oz) orthogonal to the plane of the substrate). Owing to the pillars 183, this thickness may be greater than or equal to 30 µm, and even greater than or equal to 50 µm, or even greater than or equal to 100 µm. Preferably, a ratio between the thickness of the abrasion-resistance layer 182 and a pixel repetition pitch of the sensor is greater than or equal to 0.05 or even greater than or equal to 0.1 and even greater than or equal to 1.

In this case, the pillars 183 are distributed regularly, in rows and columns, so that each pixel of the pixel array has a single pillar 183. Preferably, the geometric centre of a pillar 183 and the geometric centre of the associated pixel are aligned according to an axis parallel to the axis (Oz).

The pillars 183 have, for example, a shape of a cylinder of revolution, having:
a diameter D (dimension in a plane parallel to the plane of the substrate 110); and a height h (dimension according to the axis (Oz), orthogonal to the plane of the substrate 110).

In this case, each pillar 183 extends, according to the axis (Oz), over the entire thickness of the abrasion-resistance layer 182, and without protruding above or below the latter. Each pillar 183 therefore has a height h equal to the thickness of the abrasion-resistance layer 182.

The diameter D is less than the pixel pitch of the pixel array, so that two adjacent pillars 183 are physically insulated from one another, by a portion of the abrasion-resistance layer 182. Said diameter D is between, for example, 10 µm and 120 µm, and preferably between 40 µm and 60 µm.

In alternatives in which the pillars have a non-circular cross-section in a plane parallel to the plane of the substrate, the diameter D is defined as being the greatest length measured on the pillar, according to a rectilinear axis located in a plane parallel to the plane of the substrate.

Figure 1C:
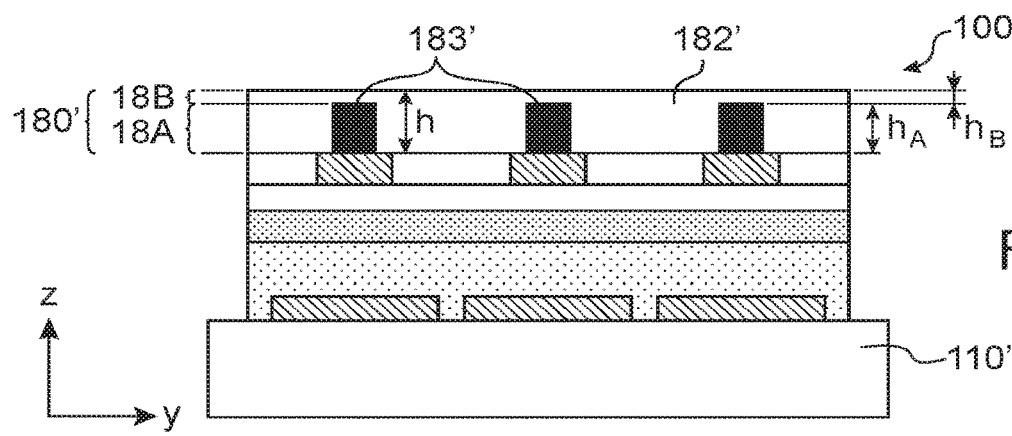
FIG. 1C shows an alternative of the embodiment of FIGS. 1A and 1B.

FIG. 1C shows, according to a cross-section view in a plane parallel to the plane (yOz), an alternative 100' of the embodiment of FIGS. 1A and 1B. This alternative 100' differs from that of FIGS. 1A and 1B only in that the pillars 183' do not extend over the entire thickness of the abrasion-resistance layer 182'. It is thus possible to distinguish two superimposed regions, in the anti-abrasion protection coating 180':
 a lower stage 18A, on the substrate 110' side, receiving the pillars 183'; and
 an upper stage 18B, on the side opposite the substrate 110' side, without pillars.

The lower stage 18A has the same height $h_A$ as the pillars (dimension according to (Oz)). The pillars 183' extend into the lower stage 18A, over the entire thickness thereof, without protruding above or below the latter.

The upper stage 18B has a height $h_B$ less than or equal to 5% of the height $h_A$ of the pillars (dimension according to (Oz)). In other words, a difference between the height of the pillars 183' and the total height h of the abrasion-resistance layer 182' is less than or equal to 5% of the height $h_A$ of the pillars. In practice, this difference is generally less than or equal to 1 µm. The upper stage encapsulates the pillars 183'. Owing to its thickness, or reduced height, the advantages mentioned above are preserved.

According to other alternatives, which are not shown, the pillars have non-circular cross-sections in planes parallel to the plane of the substrate, for example square or rectangular cross-sections.

Figure 2A:
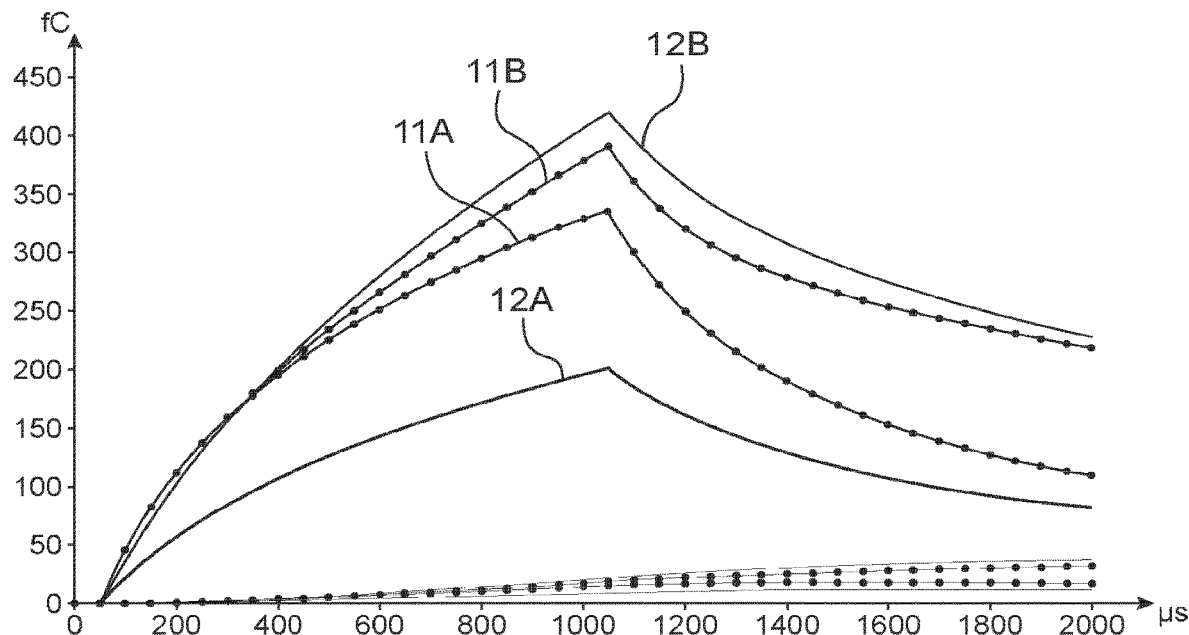
FIGS. 2A and 2B show a comparison of the thermal performances of a thermal pattern sensor according to the prior art or according to the invention.
Figure 2B:
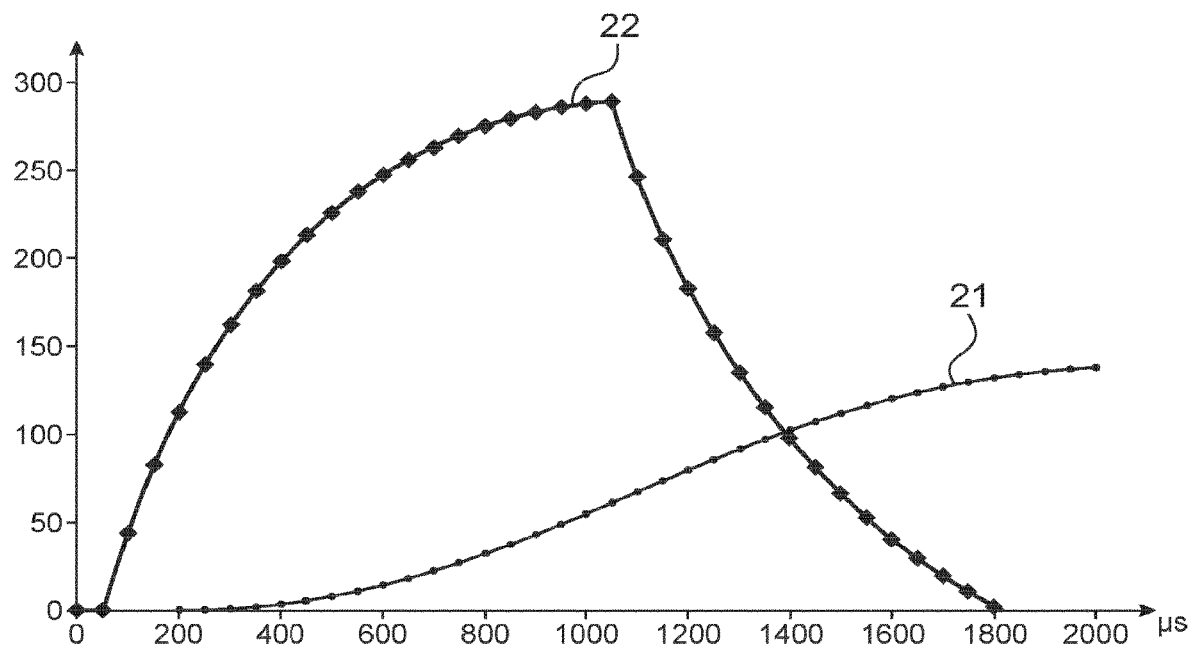

FIGS. 2A and 2B show a comparison between:
 a thermal pattern sensor according to the invention, of the type shown in FIGS. 1A and 1B, with an anti-abrasion protection coating having a thickness of 10 µm, silver pillars; and
 a thermal pattern sensor according to the prior art, with a homogeneous PET (polyethylene terephthalate) protection layer having a thickness of 10 µm.

In both cases, the pixels are distributed according to a square grid with a pitch equal to 80 µm.

In FIG. 2A, the curves 11A and 11B, show, as a function of time, a quantity of charges generated (electrical capacity) at a pixel of the sensor according to the prior art, when the pixel is covered with water (material thermally equivalent to the skin, and therefore with a ridge of a papillary print), and air (equivalent to a valley of a papillary print), respectively.

Curves 12A and 12B show, as a function of time, a quantity of charges generated at a pixel of the sensor according to the invention, when the pixel is covered with water and air, respectively.

In these different simulations, the heating element associated with the pixel is activated for 1 ms.

The difference between the curves associated respectively with air and with water is much greater in the case of the sensor according to the invention. The invention therefore makes it possible to improve the contrast of an image acquired by means of the thermal pattern sensor.

In addition, the difference between the two curves associated respectively with air and with water reaches significant values from the start of the measurement (just 100 µs), while in the prior art it must reach around 1 millisecond before a satisfactory contrast is obtained. The invention therefore makes it possible to reduce (in this case by a factor of 10) a pixel readout rate of the thermal pattern sensor.

FIG. 2B shows the difference, as a function of time, between the number of pyroelectric charges generated in a pixel covered by water or by air, in a thermal pattern sensor according to the prior art (curve 21) and in a thermal pattern sensor according to the invention (curve 22), respectively.

The observations mentioned above are summarized as follows:
 increase in contrast (in this case by a factor of 5 after one millisecond), and
 increase in heating (and cooling) rate: the curve 22 quickly reaches high values (then quickly returns to low values).

The effect on contrast enables the electric power supplied to the heating elements to be reduced, without affecting the contrast by comparison with the prior art.

The increase in heating and cooling rates of the pixel makes it possible to reduce the time necessary for reading the pixels of a thermal pattern sensor.

Figure 3A:
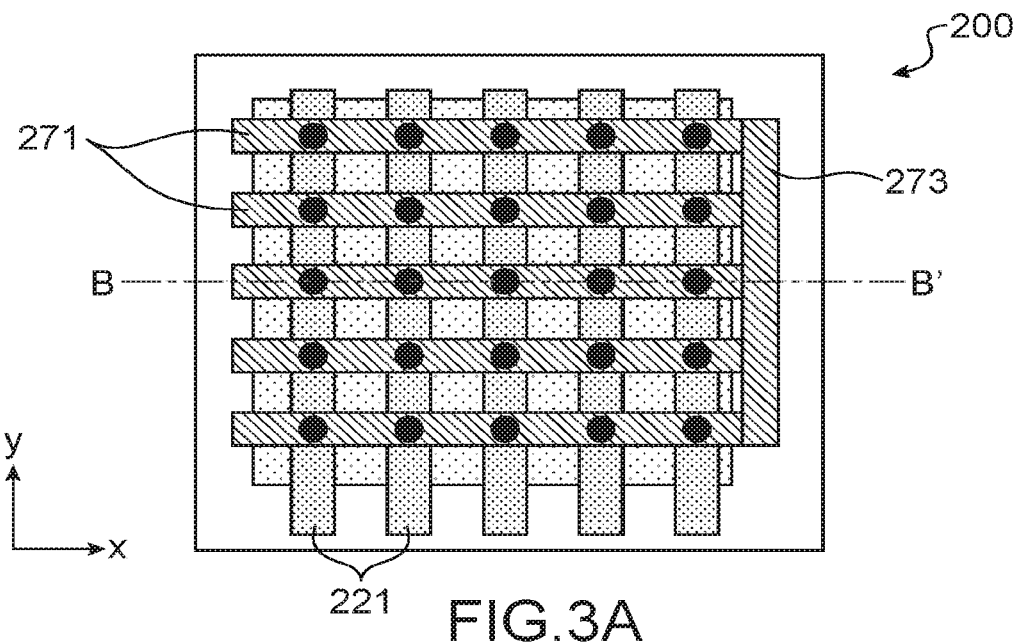
FIGS. 3A and 3B schematically show a second embodiment of a thermal pattern sensor according to the invention.
Figure 3B:
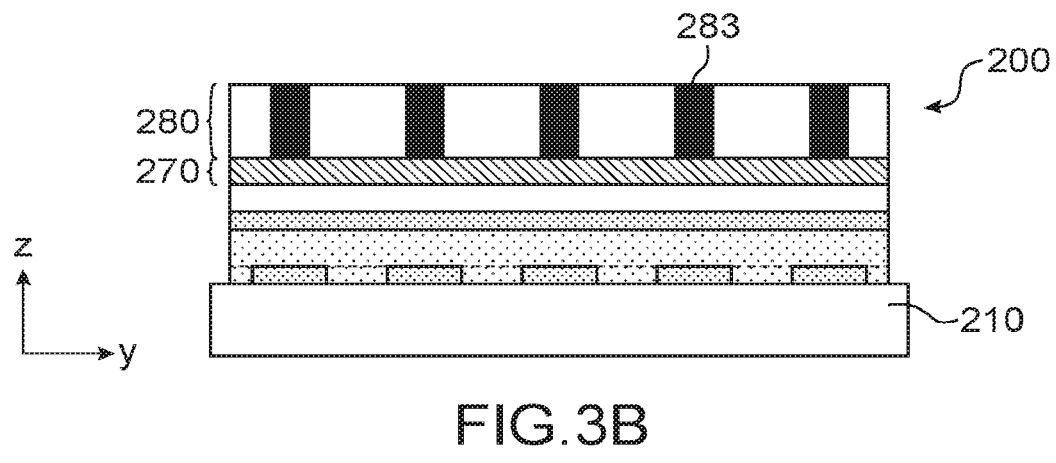

FIGS. 3A and 3B schematically show a second embodiment of a thermal pattern sensor 200 according to the invention. FIG. 3A is a schematic top view, in a plane parallel to the plane (xOy). FIG. 3B is a cross-section view in a plane BB' parallel to the plane (xOz).

In said second embodiment, each pixel has a heating element, and said heating elements are used to carry out a passive addressing of the pixels of the sensor.

The heating elements of the same row of pixels are electrically connected to one another to form a heating strip 271. Each heating strip 271 is configured so as to be capable of being activated independently of the other heating strips. In other words, the heating elements of the pixels of the same row of pixels are capable of heating the pyroelectric material portions of the pixels of said row, independently of the heating elements of the pixels of the other rows. The heating strips 271 each have a first end, suitable for being connected to a non-zero electric potential, and a second end, preferably connected to the ground. In this case, the second ends of all of the heating strips are connected to one another by means of a conductive portion 273.

In addition, the charge collection electrodes of the same column of pixels are electrically connected to one another to form a charge collection macroelectrode 221. Each charge collection macroelectrode 221 is formed by an electrically conductive strip, in contact with the pyroelectric material portions of the pixels of said column of pixels, and separate from the electrically conductive strips forming the charge collection macroelectrodes of the other columns of pixels.

Each charge collection macroelectrode 221 makes it possible to measure the sum of the pyroelectric charges, generated in the same pixel column. If, in each instant, only one heating strip 271 is activated, in each column of pixels, there is only one pixel that generates pyroelectric charges. The pyroelectric charges collected by the charge collection macroelectrode 221 thus concern this single pixel. Thus, a passive addressing of the pixels of the sensor is carried out.

The terms "row" and "column" may be used interchangeably, which would correspond to a simple 90° rotation of the sensor.

In this case, the charge collection electrodes of the same column of pixels are distributed, according to the axis (Ox), according to a repetition pitch less than or equal to 150 µm, for example 90 µm, or 80 µm, or 50.8 µm.

The heating strips 271 of the heating stage 270 are distributed in this case according to the axis (Oy), preferably according to a repetition pitch identical to the repetition pitch of the charge collection macroelectrodes 221.

Each pixel of the pixel array is laterally defined by the intersection between a charge collection macroelectrode 221 and a heating strip 271. In particular, each pixel is defined laterally, in planes parallel to the plane of the substrate 220, by the intersection between the orthogonal projection of a charge collection macroelectrode 221 in such a plane, and the orthogonal projection of a heating strip 271 in said same plane.

Each pixel receives a single pillar 283 of the anti-abrasion protection stage 280. This pillar therefore extends, in the anti-abrasion protection stage 280, within a defined region, in planes parallel to the plane of the substrate 220, by the intersection between the orthogonal projection of a charge collection macroelectrode 221 in such a plane and the orthogonal projection of a heating strip 271 in said same plane.

Figure 3C:
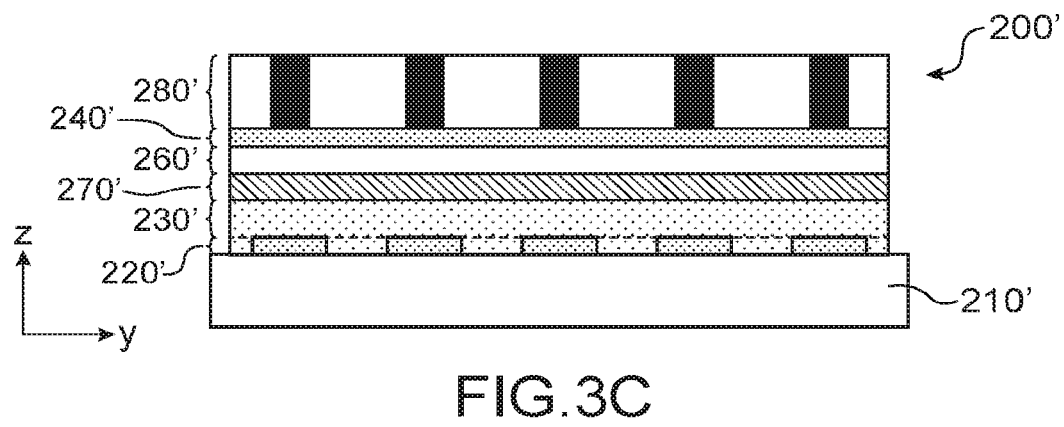
FIG. 3C shows an alternative of the embodiment of FIGS. 3A and 3B.

FIG. 3C shows an alternative 200' that differs from the embodiment of FIGS. 3A and 3B only by the order of stacking of the different layers, stages and coatings constituting the sensor. In particular, the thermal pattern sensor 200' has, superimposed in this order on top of the substrate 210':
- the stage 220' of charge collection electrodes, distributed into macroelectrodes parallel to one another;
- the stage 230' including a pyroelectric material;
- the heating stage 270', comprising heating strips parallel to one another, each heating strip being capable also of forming a reference electrode common to all of the pixels of a row of pixels;
- the electric insulation layer 260';
- the electromagnetic shielding 240'; and
- the anti-abrasion protection coating 280'.

In these two alternatives, the heating stage extends between the stage including a pyroelectric material and the anti-abrasion protection coating, with, according to the circumstances, intermediate layers between the heating stage and the stage including a pyroelectric material, and between the heating stage and the anti-abrasion protection coating, respectively.

The invention is not limited to the examples described above, and numerous alternatives may be implemented without going beyond the scope of the invention.

In particular, the invention applies to any type of thermal sensor including pyroelectric capacitances, with or without heating elements, with or without heating elements, with heating elements that are separate or grouped into heating strips. In particular, the invention is not limited to an active detection, and also covers sensors suitable for passive detection, without a heating element for heating the pyroelectric material portions.

The invention is not limited to an arrangement of the pixels so that the lower electrode forms the charge collection electrode either. The pyroelectric charge collection may be performed by the upper electrode.

The invention applies more specifically to sensors in which a distance between the contact surface and the plane of the upper faces of the lower electrodes of the pyroelectric capacitances is greater than or equal to 25% of the pixel pitch of the sensor, or even 50% of said pixel pitch (thick anti-abrasion protection coating). Advantageously, however, this distance remains less than or equal to said pixel pitch.

When the dimensions of the pixel allow it, each pixel of the pixel array may include a plurality of pillars.

The sensor may include at least one readout circuit, for measuring a quantity of charges collected by a charge collection electrode, and, as the case may be, at least one circuit for controlling the heating, for sending electrical signals making it possible to heat the pixels of the sensor by means of the heating elements. It may also include an electronic processing circuit capable of constructing an overall image of the thermal pattern, on the basis of measurements obtained at each of the pixels of the sensor.

The thermal pattern capable of being imaged by the sensor may be a papillary print, or any other pattern associated with an object having a thermal capacity and a specific heat.

The abrasion-resistance layer may be constituted by an electrically insulating material. The anti-abrasion protection coating then forms, as a whole, an electrically insulating coating since the electrically conductive pillars are insulated from one another by the electrically insulating material of the abrasion-resistance layer. Thus, a short-circuiting of the heating elements located directly below is avoided.

Alternatively, the anti-abrasion protection coating may be electrically conductive, and, according to the circumstances, also provide protection against electrostatic discharges. Preferably, its electrical conductivity is low enough with respect to that of the heating elements that it does not disrupt their operation, but is sufficient for discharging an electrostatic discharge.

Various advantageous embodiments for producing the anti-abrasion protection coating according to the description are described below.

Figure 4:
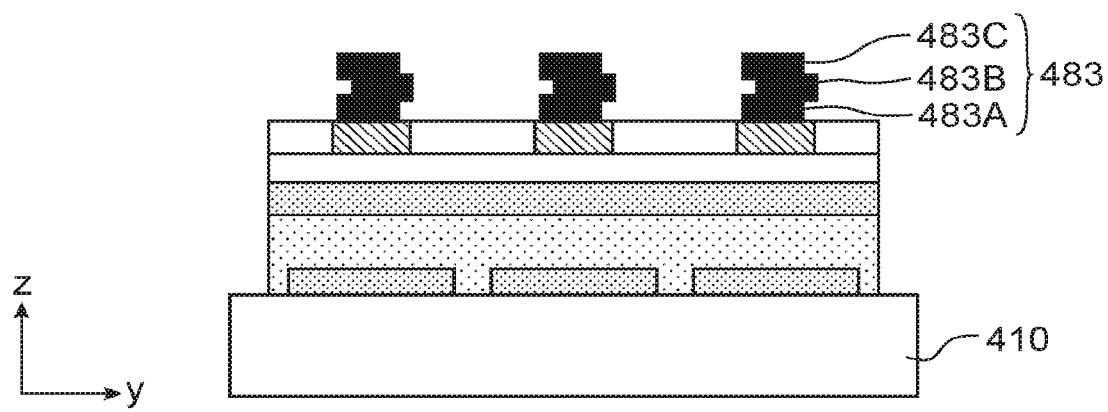
FIGS. 4 to 6 schematically show different embodiments of a method for producing a thermal pattern sensor according to the invention.

According to a first embodiment, schematically shown in FIG. 4, the pillars 483 of the anti-abrasion protection coating are formed by localized deposits of a metallic ink, for example by means of an inkjet printer.

To produce high pillars greater than 15 µm, multiple series of basic pillars 483A, 483B, 483C, are successively deposited, each pillar being formed by superimposing, according to axis (Oz), multiple basic pillars. It is not necessary for the lateral and transverse alignment (in a plane parallel to the plane of the substrate 410) of the basic pillars 483A, 483B, 483C to be perfect.

Then, an abrasion-resistant and thermally insulating material is deposited, which is inserted between the pillars and forms the abrasion-resistance layer.

Alternatively, it is possible to first deposit the abrasion-resistance layer so that it extends without an opening over the substrate, then to transform it in the locations of the pillars. The transformation here refers to a local etching, or a local exposure that locally modifies the physical properties of the material, in particular its thermal conduction. According to the circumstances, the method then includes a step of producing pillars in the etched openings.

To etch the abrasion-resistance layer in the desired locations, it is possible simply to use a mask with openings in the desired locations for the pillars.

Figure 5:
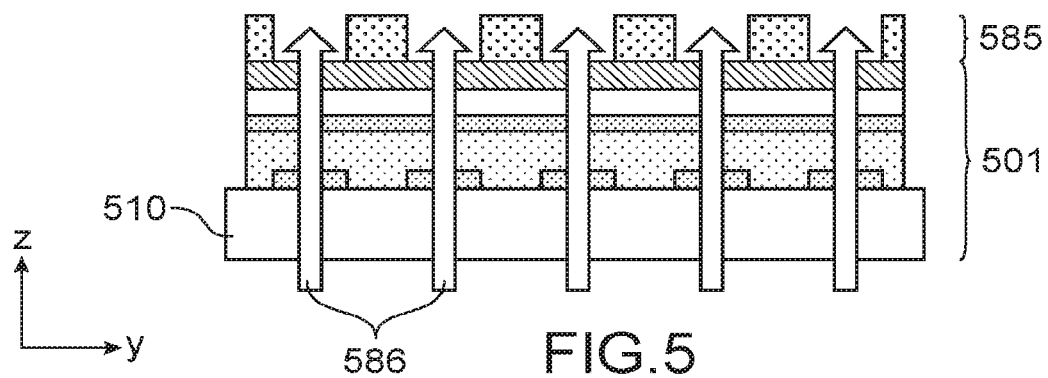

FIG. 5 shows an alternative, taking advantage of the arrangement shown in FIGS. 3A to 3C, in which the charge collection electrodes of the same column of pixels are formed together in a single piece in the same macroelectrode, the heating elements of the same row of pixels are formed together in a single piece in the same heating strip, and the pillars are located at the intersection between the orthogonal projection of a heating strip and the orthogonal projection of a charge collection macroelectrode.

In the method of FIG. 5, a photosensitive material layer 585 is deposited on a stack 501 comprising the substrate 510, the pyroelectric capacitances and the heating elements.

Then, the photosensitive material layer 585 is insulated from the rear, i.e. from the side of the substrate 510. The different elements comprising the stack 501 are substantially transparent to the wavelength of the exposure light beam 586, except for the charge collection macroelectrodes and the heating strips made of metal. The power of the exposure light beam 586 is adapted so that said beam passes through the stack 501, except in the locations where a charge collection macroelectrode and a heating strip are superimposed according to the axis (Oz). Thus, the photosensitive material layer 585 is etched throughout, except in these locations.

The material of the abrasion-resistance layer is then deposited in the etched openings of the photosensitive material layer 585. Then, the remaining portions of said photosensitive material layer 585 are etched, and they are filled with the material of the pillars.

A self-alignment of the pillars on the pixels of the pixel array is thus achieved.

Regardless of the method implemented in order to produce an abrasion-resistance layer having etched openings, different solutions may be implemented in order to fill said openings with the material of the pillars.

According to a first alternative, the filling is performed by screen printing, with an ink based on a metal such as silver, which is deposited on the abrasion-resistance layer and scraped in order to bring it into the etched openings. The abrasion-resistance layer is advantageously constituted by a material to which the ink does not adhere, so that the ink binds only in the etched openings. For this, the abrasion-resistance layer may include or be constituted by benzocyclobutene, advantageously annealed at a temperature greater than or equal to 150° C. Vacuum annealing may be implemented in order to help the ink penetrate the etched openings, for example at a pressure less than or equal to 10 mbar.

According to another alternative, it is possible to grow a metal from the bottom of the etched openings, from the metal of the heating strips flush with the bottom of said etched openings. This alternative uses a bath comprising metal particles mixed with a catalyst.

In said two alternatives, an upper region of the etched openings may be reserved for a fine encapsulation layer covering and protecting the pillars located below.

In each of the methods described above, the abrasion-resistance layer may be produced by a plurality of successive depositions of basic layers that are superimposed one on top of another according to the axis (Oz).

Figure 6:
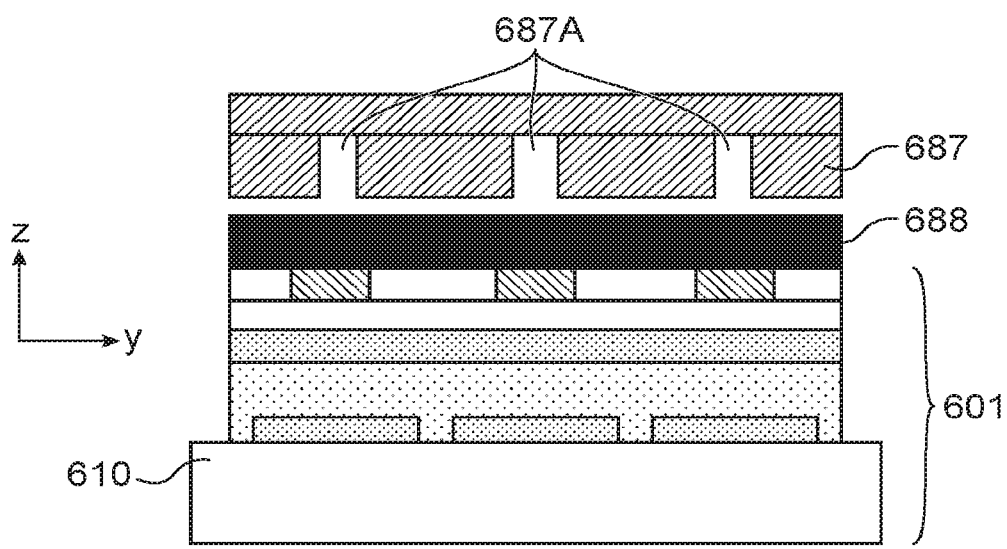

FIG. 6 shows a third embodiment, using a buffer 687, the recesses and protuberances of which are adapted to the desired positions of the pillars.

In this case, a solid layer 688 of a metallic ink is deposited on top of a stack 601 comprising the substrate 610, the pyroelectric capacitances and the heating elements. The buffer 687 having recesses 687A is then pressed at the desired locations of the pillars, so that the ink is preserved only in the locations of said recesses 687A.

Numerous alternatives using a buffer may be implemented, in which:

droplets of a metallic ink are deposited, instead of a solid layer of metallic ink, before the buffer is pressed;

the recesses of the buffer are filled with a metallic ink, then the assembly is applied to the stack as defined above, so that the ink in the recesses of the buffer adheres to the stack and detaches from the buffer when the latter is removed;

a droplet of a metallic ink is deposited at the inlet of each recess of the buffer, then the assembly is applied to the stack as defined above, so that the ink droplets adhere to the stack and detach from the buffer when the latter is removed;

the metallic ink is applied instead on the protuberances of the buffer, then the assembly is applied to the stack as defined above, so that the ink on the protuberances of the buffer adheres to the stack and detaches from the buffer when the latter is removed (the position of the recesses and the protuberances of the buffer is adapted as a consequence); etc.

Numerous other methods may be implemented, and may or may not use an ink to produce the pillars of the anti-abrasion protection coating, and which may use an ink based on metal particles and/or based on graphene particles.

For example, it is possible to use an anisotropic adhesive comprising metallic beads, for example silver, of suitable sizes. A layer of said adhesive is deposited onto a stack as described in reference to FIG. 6, then pressure is applied on said adhesive layer so as to crush the metallic balls. Each metallic ball thus forms a pillar according to the invention. Preferably, the pressure is exerted at the same time that heat is applied, which makes it possible to polymerize the adhesive receiving the metallic beads, which then forms the thermally insulating layer of the anti-abrasion protection coating. According to the circumstances, a fine polyimide layer is inserted between the anisotropic adhesive layer and a pressure application surface, so as to prevent the adhesive from adhering to said application surface.

According to another example, the metallic pillars may be produced by means of techniques derived from the so-called "flip chip" bonding technique. Such a bond is normally intended for the electrical connection between electrically conductive tracks superimposed according to the axis (Oz), and uses a metallic bead inserted between said two tracks, according to the axis (Oz). For example, an electric insulator is deposited onto a stack as described in reference to FIG. 6, then openings are etched in the locations intended for the pillars, and said openings are filled with copper. Finally, the pillars are formed on the copper deposits by techniques for depositing tin-lead on copper.

The invention claimed is:

1. A thermal pattern sensor comprising a plurality of pixels arranged on a substrate, each pixel having at least one pyroelectric capacitance formed by at least one portion of pyroelectric material arranged between at least one lower electrode and at least one upper electrode, with the lower electrode arranged between the substrate and the pyroelectric material portion, said sensor including an external anti-abrasion protection coating, located on the side opposite the substrate, characterized in that the anti-abrasion protection coating includes a abrasion-resistance layer, and a plurality of pillars distributed in the abrasion-resistance layer, the pillars having a thermal conductivity strictly greater than that of the abrasion-resistance layer.

2. The sensor according to claim 1, wherein the anti-abrasion protection coating has a thickness (h) greater than or equal to 5% of a pixel repetition pitch of the thermal pattern sensor.

3. The sensor according to claim 1, wherein the anti-abrasion protection coating has a thickness (h) greater than or equal to 3 µm.

4. The sensor according to claim 1, wherein the thickness of the anti-abrasion protection coating is greater than or equal to the height ($h_A$) of the pillars, with said thickness and said height each defined according to an axis orthogonal to the plane of the substrate, and wherein a difference between the thickness (h) of the anti-abrasion protection coating and the height ($h_A$) of the pillars is less than or equal to 5% of the height ($h_A$) of the pillars.

5. The sensor according to claim 1, wherein each pixel of the sensor comprises a portion of the anti-abrasion protection coating, said portion comprising a single pillar.

6. The sensor according to claim 1, wherein the pillars of the anti-abrasion protection coating have a thermal conductivity at least ten times greater than that of the abrasion-resistance layer.

7. The sensor according to claim 1, wherein the pillars of the anti-abrasion protection coating include a metal or graphene.

8. The sensor according to claim 1, wherein the abrasion-resistance layer includes a benzocyclobutene-based material.

9. The sensor according to claim 1, wherein the abrasion-resistance layer is made of an electrically insulating material.

10. The sensor according to claim 1, wherein the pixels of the sensor are arranged in rows and columns, wherein each pixel also comprises a heating element capable of heating, by the Joule effect, the pyroelectric material portion of said pixel, and wherein:
   the heating elements of the same row of pixels are formed together in a single piece, in the same heating strip;
   in each pixel, one of the upper electrode and lower electrode forms a charge collection electrode, and the charge collection electrodes of the same pixel column are formed together in a single piece in a charge collection macroelectrode; and
   each pillar of the anti-abrasion protection coating extends through an intersection region between an orthogonal projection of a heating strip and an orthogonal projection of a charge collection macroelectrode, in a plane parallel to the plane of the substrate.

11. The sensor according to claim 1, wherein the pillars of the anti-abrasion protection coating are each constituted by a plurality of basic pillars, superimposed according to an axis orthogonal to the plane of the substrate.

12. A method for producing the anti-abrasion protection coating of a sensor according to claim 1, said method comprising a step of producing the pillars using an ink based on metal and/or graphene particles.

13. The method according to claim 12, wherein the step of producing the pillars includes one or more localized depositions of ink, with an inkjet printer.

14. The method according to claim 12, wherein the production of the anti-abrasion protection coating comprising the following steps:
   producing the abrasion-resistance layer, equipped with through-openings distributed according to a plane parallel to the plane of the substrate; and
   filling the through-openings with metal and/or graphene particle-based ink.

15. The method according to claim 14, for producing a sensor, comprising the following steps:
   depositing a photosensitive layer, on a stack including the substrate, the pyroelectric capacitances and the heating elements;
   illuminating the photosensitive layer from the side of the substrate, with an etching light beam the power of which is suitable for passing through said stack except where a heating strip and a charge collection macroelectrode are superimposed; and
   filling the openings etched in the photosensitive layer with the material of the abrasion-resistance layer.

* * * * *